(12) United States Patent
Beckhusen

(10) Patent No.: US 9,938,672 B2
(45) Date of Patent: Apr. 10, 2018

(54) VIBRATION ISOLATOR WITH HYDRAULIC PASS-THRU

(71) Applicant: Caterpillar Inc., Peoria, IL (US)

(72) Inventor: Jordan Beckhusen, Robinson, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/264,837

(22) Filed: Sep. 14, 2016

(65) Prior Publication Data

US 2018/0073203 A1 Mar. 15, 2018

(51) Int. Cl.
 *E01C 19/38* (2006.01)
 *F16F 15/08* (2006.01)
 *E02D 3/046* (2006.01)

(52) U.S. Cl.
 CPC .............. *E01C 19/38* (2013.01); *E02D 3/046* (2013.01); *F16F 15/08* (2013.01)

(58) Field of Classification Search
 CPC ...... E01C 19/34; E01C 19/38; E01C 2301/00; E02D 3/046; F16F 15/08
 See application file for complete search history.

(56) References Cited

U.S. PATENT DOCUMENTS

| | | | | |
|---|---|---|---|---|
| 3,909,149 A | * | 9/1975 | Century | E02D 3/074 173/162.1 |
| 3,917,426 A | * | 11/1975 | Wohlwend | B06B 1/16 404/113 |
| 4,113,403 A | * | 9/1978 | Tertinek | E02D 3/074 404/113 |
| 4,698,926 A | * | 10/1987 | Caplis | E01C 19/38 37/195 |
| 5,453,577 A | | 9/1995 | Everett et al. | |
| 5,881,822 A | | 3/1999 | Sienkiewycz et al. | |
| 6,179,520 B1 | * | 1/2001 | Cochran | E02D 3/074 172/245 |
| 6,220,367 B1 | | 4/2001 | Masterson et al. | |
| 9,284,695 B2 | * | 3/2016 | Dulieu | E01C 19/34 |
| 2006/0278030 A1 | | 12/2006 | Tavel et al. | |
| 2014/0064858 A1 | * | 3/2014 | Paske | E02D 3/046 405/271 |
| 2015/0192310 A1 | | 7/2015 | Mehta et al. | |

* cited by examiner

*Primary Examiner* — Abigail A Risic
(74) *Attorney, Agent, or Firm* — Law Office of Kurt J. Fugman LLC

(57) ABSTRACT

A vibration isolator comprising a first attachment plate defining a first central bore, a second attachment plate defining a second central bore, and a resilient member disposed between the first and second attachment plates, wherein the resilient member defines a third central bore and the first, second and third central bores are in fluid communication with each other.

20 Claims, 5 Drawing Sheets

VIBRATION ISOLATOR WITH HYDRAULIC PASS-THRU

TECHNICAL FIELD

The present disclosure relates to vibratory plate compactors. More particularly, the present disclosure is related to a vibratory plate compactor uses hydraulic fluid to power the vibration mechanism and devices that reduce vibration and allow hydraulic fluid to be conveyed to the vibration mechanism.

BACKGROUND

Vibratory compactors are routinely used in the construction industry and the like to compact soil or other work surfaces. These are often attached to mobile machines that include a cab that houses an operator that controls the operation of the vibratory compactor. These compactors often include a vibration mechanism such as an eccentric device that causes a plate to move up and down in a rapid or vibratory manner to effectuate the flattening of the work surface. The vibration mechanism is often hydraulically powered.

In many applications, hydraulic hoses are provided to transfer hydraulic fluid from a manifold to a pump/vibration mechanism. The manifold is on the upper or stationary side of the vibratory compactor while the vibration mechanism is on the lower or vibrating side of the compactor assembly. That is to say, the lower part of the assembly moves or displaces up and down, creating the vibratory movement of the compactor plate. The hydraulic hoses are intended to provide the flexibility needed when this displacement occurs.

It has been determined hoses may rub against each other or other stationary parts of the compactor, causing the hoses to wear out. This necessitates maintenance and increased cost of owning and operating vibratory compactors undesirably. Looking now at FIG. 1, a perspective view is shown of a machine 100 using a vibratory plate compactor assembly 200 according to a prior art design used to compact soil 128. The machine 100 that is compatible with a vibratory plate compactor assembly 200, that is to say, a coupling device 102 is provided so that the vibratory plate compactor assembly 200 may be attached to the machine and be controlled by the machine 100. In this embodiment, the coupling device 102 is located at the free end 104 of the boom 106 opposite the end 108 of the boom 106 that is attached to the turn table 130 of the machine 100. The machine 100 further comprises a controller 110, a motor 112, a wheel or track undercarriage 114 that is driven by the motor 112, and the vibratory plate compactor assembly 200 that is attached to the boom 106 of the machine 100 using the coupling device 102 as already mentioned. The controller 110 is in communication or operative association with the controls 116 provided in the cab 118 so that the operator may control the movement and function of various parts and systems of the machine 100.

More specifically, the machine 100 depicted in FIG. 1 is a large excavator but it is contemplated that other machines such as backhoes and the like could also use a vibratory plate compactor assembly 200 according to any embodiment of the present disclosure. Furthermore, the machine 100 is mobile on a track driven undercarriage 114 but a more conventional wheel or tire type undercarriage may also be used that is powered by the motor 112. For this machine 100, the motor 112 comprises an internal combustion engine but other motors such as an electric motor could be used for other embodiments. In addition, hydraulic hoses 120 connect the cylinders 122 that move the linkage members 124 of the boom 106 to an hydraulic manifold 126. Similarly, hydraulic hoses 120' connect the vibration mechanism 202 of the vibratory plate compactor assembly 200 to the manifold 126 (shown in hidden lines). A hydraulic pump (not shown) provides the hydraulic fluid necessary to rotate or otherwise drive the eccentric mechanism 204 that is part of the vibration mechanism 202. The movement of the boom 106 and powering of the vibration mechanism 202 may be achieved by other devices or methods in other embodiments such as by mechanical or electrical power, etc.

Turning now to FIG. 2, the coupling device 102 that connects the vibratory plate compactor assembly 200 to the machine 100 can be seen more clearly as well as the hydraulic hoses 120' that connect the vibration mechanism 202 to the hydraulic manifold 206 (shown by hidden lines) of the assembly 200 and system of the machine via hoses 120. The assembly includes an adapter subassembly 208 that is attached to the top plate 210 of the assembly 200 using fasteners, welding, etc. The adapter subassembly 208 includes a first side plate 220 with two ear portions 212 that define pin receiving bores 214 and a second side plate 216 with two ear portions 218 that define pin receiving bores that are aligned concentrically with the pin receiving bores 214 of the first side plate 220. Only one side may be clearly seen as the other side is obstructed by the boom 106 of the machine, but it is to be understood that both sides may be similarly constructed. Pins 222 that are part of the coupling device 102 of the machine extend through the bores 214 to hold the adapter subassembly 208 and vibratory plate compactor assembly 200 to the boom 106 of the machine 100. In some embodiments, the coupling device 102 may be a quick change coupling mechanism but this might not be the case for other embodiments. In some cases, the assembly 200 may be permanently attached to the machine 100.

Now referring to FIGS. 2 and 3, the vibratory plate compactor assembly 200 comprises an upper portion 224, a lower portion 226 that is movably attached to the upper portion 224 and that includes a compacting plate 244, a vibration mechanism 202 operatively associated with the lower portion 226 for vibrating the lower portion 226, a plurality of isolation mounts 240 and a hydraulic hose 120' that runs from the manifold 206, which is attached to the remote side of the upper portion 224 of the compactor 200 that does not move, to the vibration mechanism 202 that is on the lower portion 226 of the compactor 200 that does move. Movement or flexing of the hose is represented by arrows 254. As mentioned previously, this may cause the hoses to wear out, requiring machine downtime and maintenance, leading to increased cost.

SUMMARY OF THE DISCLOSURE

A vibration isolator is provided comprising a first attachment plate defining a first central bore, a second attachment plate defining a second central bore, and a resilient member disposed between the first and second attachment plates, wherein the resilient member defines a third central bore and the first, second and third central bores are in fluid communication with each other.

A vibratory plate compactor assembly is provided comprising an upper portion, a lower portion that is movably attached to the upper portion and that includes a compacting plate, a vibration mechanism operatively associated with the lower portion for vibrating the lower portion, a hydraulic manifold that is attached to the upper portion, and at least a first vibration isolator that connects the upper portion to the lower portion. The vibration isolator may include a first attachment plate defining a first central bore, a second attachment plate defining a second central bore and a resilient member disposed between the first and second attachment plates, wherein the resilient member defines a third central bore and the first, second and third central bores are in fluid communication with each other.

A vibratory plate compactor assembly is provided comprising an upper portion, a lower portion that is movably attached to the upper portion and that includes a compacting plate, a vibration mechanism operatively associated with the lower portion for vibrating the lower portion, a hydraulic manifold that is attached to the upper portion and a first vibration isolator that connects the upper portion to the lower portion; the vibration isolator including a first attachment plate defining a first central bore, a second attachment plate defining a second central bore, and a resilient member disposed between the first and second attachment plates, wherein the resilient member defines a third central bore and the first, second and third central bores are in fluid communication with each other. The assembly may further comprise a second vibration isolator that is similarly configured to the first vibration isolator, a first rigid tubing that is in fluid communication with the manifold and the first vibration isolator, a second rigid tubing that is in fluid communication with the first vibration isolator and the vibration mechanism, a third rigid tubing that is in fluid communication with the vibration mechanism and the second vibration isolator, and a fourth rigid tubing that is in fluid communication with the second vibration isolator and the manifold.

DETAILED DESCRIPTION

Figure 1:
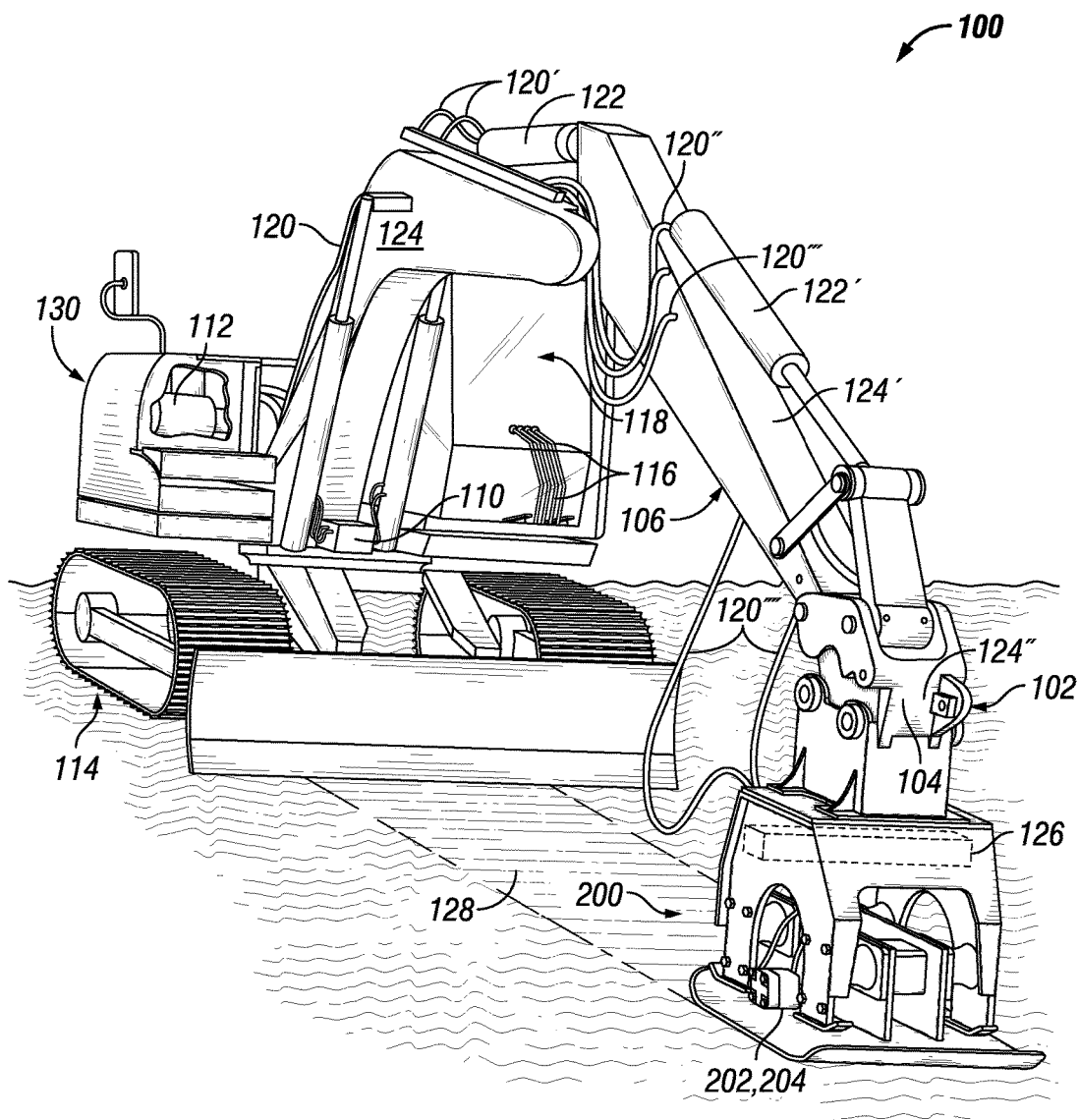
FIG. 1 is a perspective view of a machine using a vibratory plate compactor assembly as known in the art.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure provides various embodiments that would allow the transfer of hydraulic fluid through a hollow cavity in the isolators. This would allow for tubes to be run from the manifold to the isolator, and from the opposite of the isolator to the motor. The flex in the isolator replaces the hoses and eliminates the need for hoses. If a rigid tube is used, the problems associated with hoses may be eliminated. In yet further embodiments, the hydraulic fluid may be used to cool the isolator, helping to prolong the useful life of the isolator.

Figure 2:
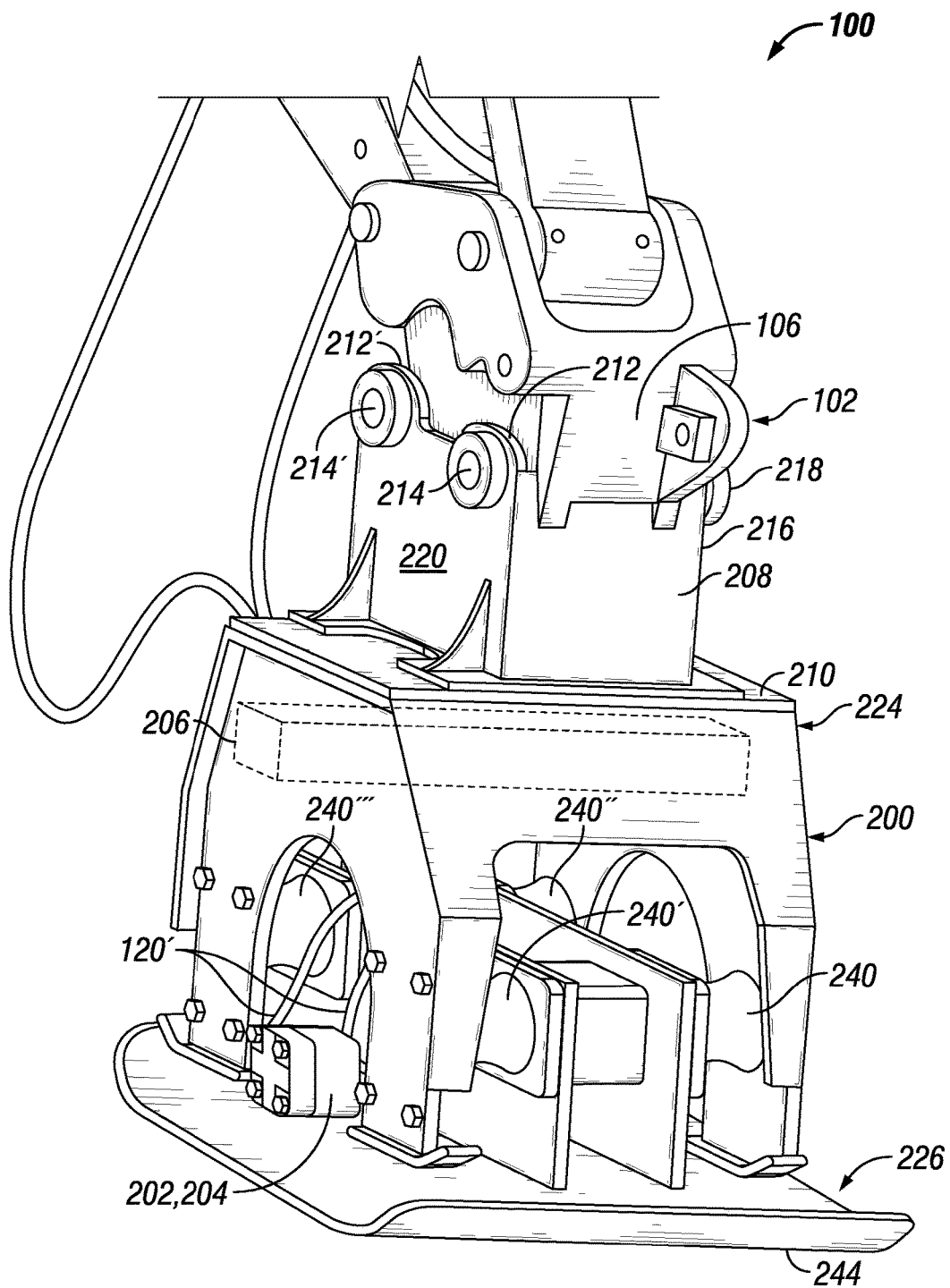
FIG. 2 is an enlarged detail view of the vibratory plate compactor assembly connected to the boom of the machine of FIG. 1.
Figure 4:
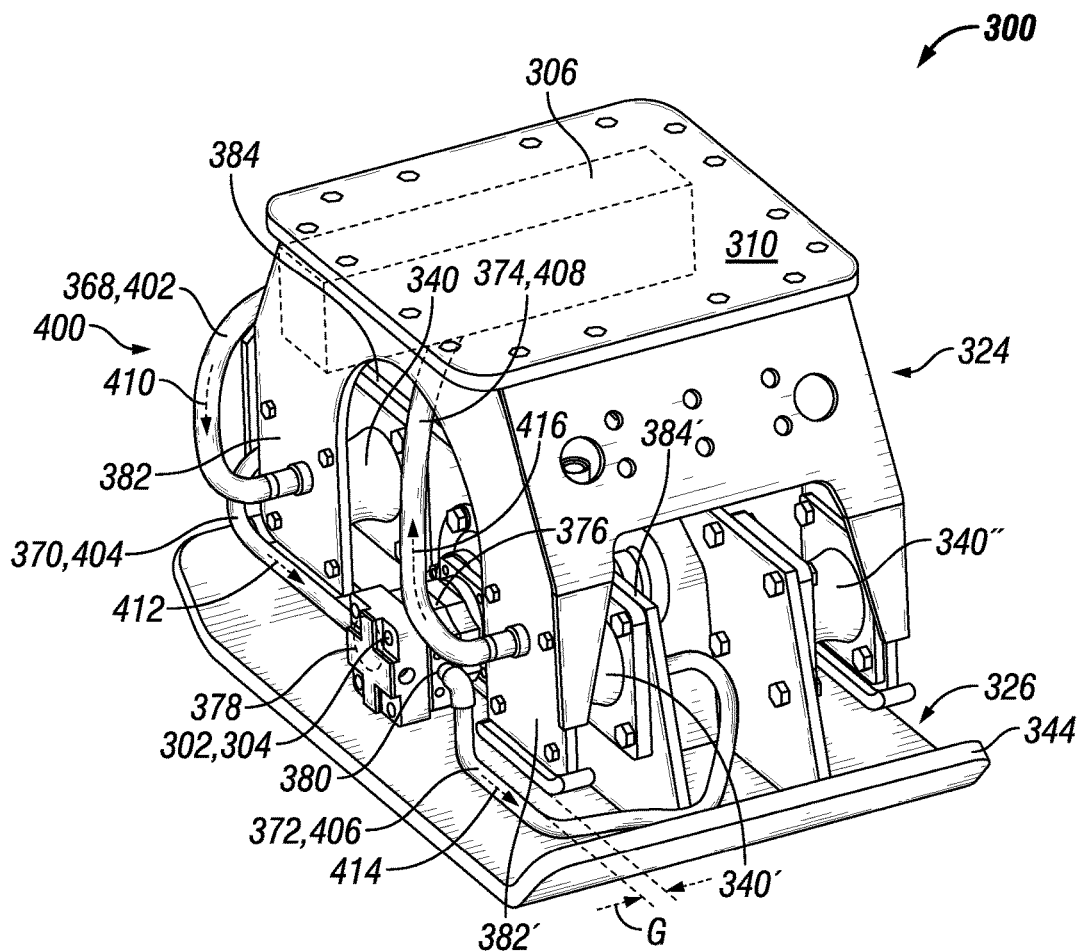
FIG. 4 is a perspective view of a compactor assembly according to an embodiment of the present disclosure that employs a vibration isolator with hydraulic pass-thru.
Figure 5:
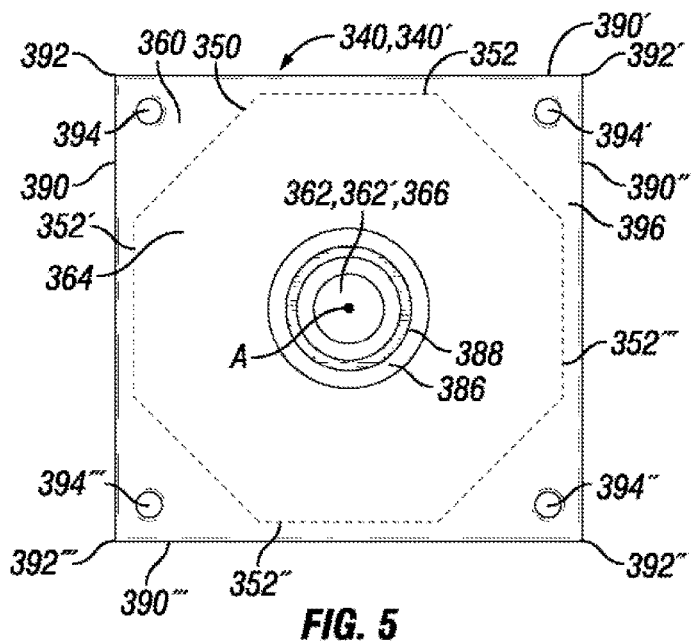
FIG. 5 is a side view of a vibration isolator with hydraulic pass-thru used in the compactor assembly of FIG. 4 shown in isolation from the assembly.
Figure 6:
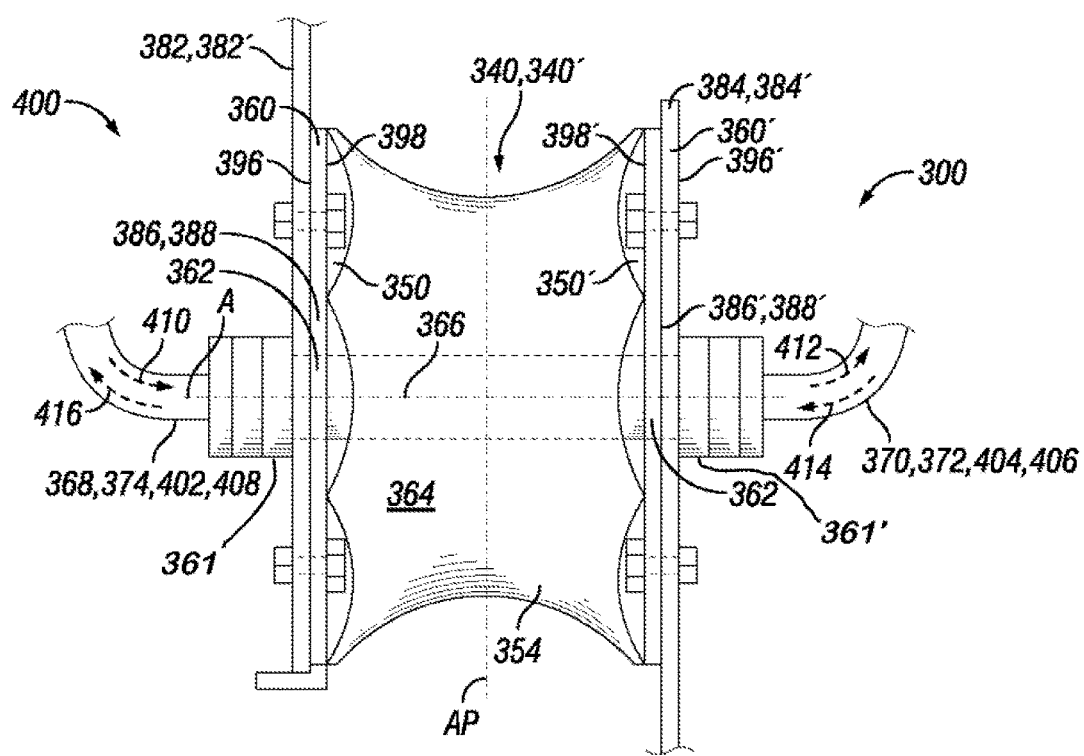
FIG. 6 is an enlarged front view of the compactor assembly of FIG. 4 showing the inner hydraulic hose that comes from the hydraulic manifold to the isolator and the outer hydraulic hose that comes from the isolator and that is connected to the vibration mechanism.

Focusing now on FIGS. 4 thru 6, a vibratory plate compactor assembly 300 according to an embodiment of the present disclosure is illustrated. The compactor 300 comprises an upper portion 324, a lower portion 326 that is movably attached to the upper portion 324 and that includes a compacting plate 344, a vibration mechanism 302 operatively associated with the lower portion 326 for vibrating the lower portion 326, a hydraulic manifold 306 that is attached to the upper portion 324, and at least a first vibration isolator 340 that connects the upper portion 324 to the lower portion 326. A top plate 310 is also shown that may be used to attach an adapter subassembly that is similarly configured as that shown in FIGS. 1 and 2.

As best seen in FIGS. 5 and 6, the vibration isolator 340 may include a first attachment plate 360 defining a first central bore 362, a second attachment plate 360' defining a second central bore 362', and a resilient member 364 disposed between the first and second attachment plates 360, 360', wherein the resilient member 364 defines a third central bore 366 and the first, second and third central bores 362, 362' and 366 are in fluid communication with each other.

Returning to FIG. 4, the assembly 300 may further comprise a second vibration isolator 340' that is similarly configured as the first vibration isolator 340. In such an embodiment, the assembly 300 may also include a first conduit 368 that connects the first vibration isolator 340 to the manifold 306 and a second conduit 370 that connects the first vibration isolator 340 to the vibration mechanism 302. Moreover, a third conduit 372 may be provided that connects the second vibration isolator 340' to the vibration mechanism 302 and a fourth conduit 374 that connects the second vibration isolator 340' to the manifold 306. The term conduit is to be interpreted broadly and includes flexible hoses and rigid tubing. The specific embodiment shown in FIG. 4 would use rigid tubing to help ensure that that the tubing does not contact the upper portion 324 of the compactor 300 during vibration. That is to say, a gap G would be maintained by the rigidity of the tubing. In other embodiments, the conduit may be routed toward the interior of the compactor instead of toward the exterior. In such a case, flexible hosing may be suitable provided it is sufficiently guided or bound to prevent its contact with the upper portion of the compactor assembly. These connections may be made in a myriad of possible ways in other embodiments.

Third and a fourth vibration isolators would also likely be provided. Only the third isolator 340" is visible in FIG. 4 since the fourth is obstructed by the other components of the compactor 300 but it is to be understood that it is in fact present. In many embodiments, the third and fourth isolators may lack fluid communicating bores of any sort or may not be otherwise hollow as they would not necessarily need to be hollow as no hydraulic fluid would need to be run through them.

Continuing to focus on FIG. 4, the vibration mechanism 302 includes a hydraulic cylinder 376 that includes a hydraulic inlet 378 and a hydraulic outlet 380 that are in close proximity to one another and the first vibration isolator 340 is in close proximity to the inlet 378 and the second vibration isolator 340' is in close proximity to the outlet 380. Contrarily, the third and fourth vibration isolators (see 340" for example) are disposed on the opposite side of the assembly 300 compared to the position of the first and second vibration isolators 340, 340'. An eccentric mechanism 304 may be housed in the hydraulic cylinder 376.

Figure 3:
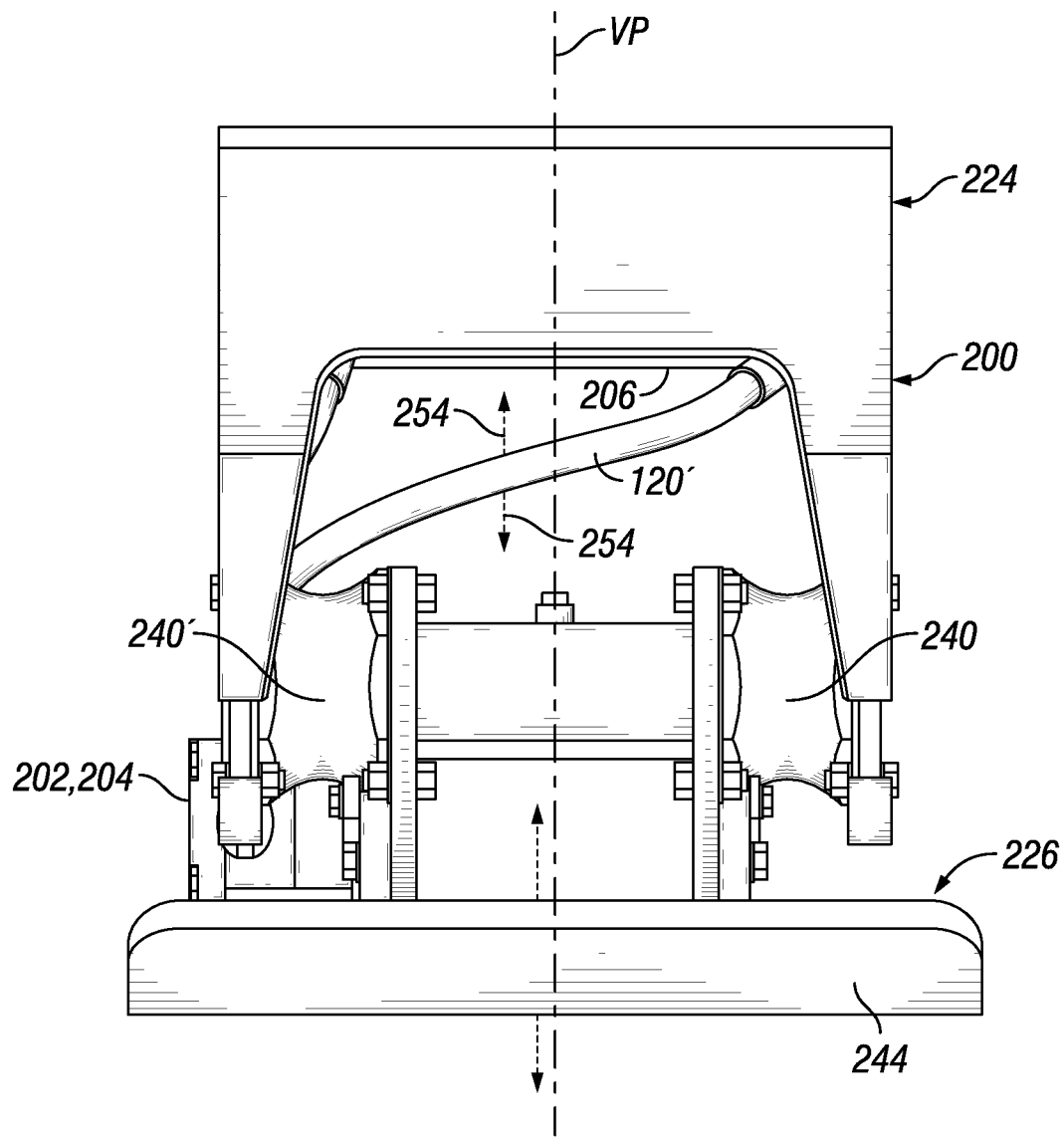
FIG. 3 is a front view of the compactor assembly of FIG. 2, illustrating the flexing of the hydraulic hose as the lower part of the assembly moves up and down.

The upper portion 324 of the assembly 300 includes a downward extending connecting bracket 382 and the lower portion 326 of the assembly 300 includes an upward extending attachment bracket 384 and the first vibration isolator 340 is fastened to and positioned between the upward extending and downwardly extending brackets 384, 382. Similarly, the second vibration isolator 340' is fastened to and positioned between the downward connecting bracket 382' and upward extending attachment bracket 384'. The connections and positions of the third and fourth vibration isolators relative to the upper and lower portions of the compactor assembly are mirrored about a vertical mid-plane VP similar to what is shown in FIG. 3.

The vibration mechanism illustrated in FIG. 4 comprises an eccentric mechanism 304 that is configured to be hydraulically rotated. However, other vibration mechanisms 302 could be employed such as reciprocating pistons or masses that are hydraulically or pneumatically driven. Also, one or more eccentrically shaped shafts may be rotated. It is further contemplated that an imbalanced mass stator may be rotated about a shaft using fluid dynamic forces, etc.

Looking now at FIGS. 5 and 6, the attachment plates 360, 360' of the first and second vibration isolators 340, 340' each defines a seal groove 386, 386' and a seal 388, 388' is disposed in the seal groove 386, 386'. It is contemplated that the seal may be an O-ring type seal in some embodiments but quad type seals could also be employed, etc. In other embodiments, the seal groove 386 could be disposed on the attachment brackets 382, 384 or other components of the compactor assembly 300.

With continued reference to FIGS. 5 and 6, the general construction of vibration isolator 340, 340' shown substantially separate from the compactor assembly 300 may be characterized as follows. The vibration isolator 340, 340' may comprise a first attachment plate 360 defining a first central bore 362, a second attachment plate 360' defining a second central bore 362', and a resilient member 364 disposed between the first and second attachment plates 360, 360', wherein the resilient member 364 defines a third central bore 366 and the first, second and third central bores 362, 362' and 366 are in fluid communication with each other. The first and second attachment plates 360, 360' may be bonded to the resilient member 364, providing a fluid tight seal between each attachment plate and the resilient member. Alternatively, a seal may be provided between the plates and the resilient member.

As shown in FIGS. 5 and 6, the first and second attachment plates may include identical configurations and the isolator may be symmetrical about an axial midplane AP. However, this may not be the case for other embodiments. For the particular embodiments shown in FIGS. 5 and 6, the attachment plates include a rectangular configuration with four straight sides 390 that meet at four corners 392, wherein the plates define a mounting hole 394 in each corner. Also, the first and second attachment plates 360, 360' include outer surfaces 396 that are flat and inner surfaces 398 that contact the resilient member 364 that are flat. These surfaces may be differently configured as needed or desired.

The outer surfaces 396 of the first and second attachment plates 360, 360' define the seal grooves such as O-ring grooves that surround the central bores of the attachment plates. Seals such as O-rings may be disposed in these grooves as mentioned previously herein.

Focusing now on the resilient member 364, it includes a first end and a second end 350, 350' that have generally octagonal configurations that define octagonal perimeters with eight flat sides 352. As best seen in FIG. 5, every other flat side 352 of the octagonal perimeter is at least nearly tangent to a straight side 390 of an attachment plate 360. As best seen in FIG. 6, the resilient member defines a necked intermediate portion 354 disposed between the first and second ends 352. Furthermore, the attachment plates and resilient member each define a center of mass and the central bores include a cylindrical configuration with a center. Each of the centers of the central bores and each of the centers of mass are aligned with each other, that is to say, they share the same axis A and are concentric with each other. This may not be the case in other embodiments.

INDUSTRIAL APPLICABILITY

In practice, a vibratory plate compactor assembly as discussed herein may be manufactured, sold or attached to a machine as described herein. This may be done in an aftermarket or OEM context, that is to say, the vibratory plate compactor assembly may be sold originally with a machine or be attached to the machine later after the original purchase of the machine. Similarly, a machine may originally be equipped or configured to use any of the embodiments of a vibratory plate compactor assembly as described herein or be retrofitted with the ability to use such assemblies. Furthermore, any vibration isolator as described herein may be manufactured, sold, obtained, etc. for use with a compactor assembly that is currently in the field, whether that assembly had similarly constructed vibration isolators or not. For example, assemblies already in the filed may be repaired and/or retrofitted with a vibration isolator as described herein.

The resilient portion or member of the vibration isolator may be made from any suitable material such as rubber, polyurethane, etc. When rubber is used, the rubber may be natural, synthetic, or some suitable combination of natural and synthetic materials.

A particular hydraulic circuit 400 will now be described with reference to FIGS. 4 and 6 that is compatible with assemblies 200 that are already in the field that use flexible hosing such as those assemblies 200 described previously with reference to FIGS. 1-3. Consequently, such assemblies may be retrofitted with vibration isolators 340 and, if desired, rigid tubing to match various embodiments of the present disclosure as described with reference to FIGS. 4 and 6. It is to be understood that the manifold 306 of the compactor assembly 300 receives pressurized fluid from the machine 100 through hydraulic hoses 120 shown in FIGS. 1 and 2 as previously described herein.

An exemplary hydraulic circuit 400 could begin at the outlet of the manifold 306, to which a first conduit, such as a first rigid tubing 402, may be connected to communicate hydraulic fluid to the first vibration isolator 340. These connections may be facilitated by the use of a first hydraulic fitting 361 interposed between the first rigid tubing and the manifold outlet and the first conduit and the downward extending connecting bracket 382. The hydraulic fluid could thus flow from the manifold 306 to the first vibration isolator 340 and begin to pass through the first vibration isolator 340. A second rigid tubing 404 may then connect the first vibration isolator 340 to the inlet 378 of the vibration mechanism 302. Again, the connections between the second rigid tubing 404 and the vibration mechanism 302 and the upward extending attachment bracket 384, to which the first vibration isolator 340 may be fastened, may be facilitated using a second hydraulic fitting 361'. The second rigid tubing 404 allows the hydraulic fluid to pass through the first vibration isolator 340 and the upward extending attachment bracket 384 and enter the vibration mechanism 302.

As mentioned previously, the vibration mechanism 302 may include an eccentric 304 that is rotated by the hydraulic fluid, causing the lower portion 326 of the compactor assembly 300 to move up and down. An outlet 380 may be provided for the vibration mechanism 302 that is connected to the second vibration isolator 340' via a pair of fittings and a third rigid tubing 406. More specifically, the third rigid tubing 406 may be connected to the outlet 380 of the vibration mechanism 302 through a fitting and the third rigid tubing may pass around the exterior of the compactor assembly 300 and connect to the upward extending attachment bracket 384' via a fitting proximate the second vibration isolator 340'. This allows the hydraulic fluid to exit the vibration mechanism 302 and enter the second vibration isolator 340' through the upward extending attachment bracket 384'. Yet another fitting may be provided that is in fluid communication with the downward extending connecting bracket 382' of the upper portion 324 of the compactor assembly 300 and the second isolation vibrator 340'. This fitting may be connected to a fourth rigid tubing 408 that is connected to the inlet of the manifold (hidden in FIG. 4), completing the hydraulic circuit 400.

The stages of flow of the hydraulic fluid for the hydraulic circuit 400 is depicted in FIGS. 4 and 6 by various arrows. For example, stage one of the flow from the manifold 306 to the first vibration isolator 340 is depicted by arrow 410. Stage two of the flow from the first vibration isolator 340 to the inlet 378 of the vibration mechanism 302 is depicted by arrow 412. Stage three of the flow from the outlet 380 of the vibration mechanism 302 to the second vibration isolator 340' is depicted by arrow 414. Finally, stage four of the flow from the second vibration isolator 340' to the inlet of the manifold 306 is depicted by arrow 416.

Of course, it is contemplated that the flow of this hydraulic circuit could be reversed in other embodiments. Additionally, other circuits that use the embodiments of a vibration isolator as described herein could be created as needed or desired. Furthermore, other fluids other than hydraulic fluid could be used such as air, oil, etc. In any case, the fluid that is used may be temperature controlled, cooled, heated, etc. to maintain or change the temperature of the vibration isolator so that its useful life may be prolonged, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the disclosure(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A vibration isolator comprising:
   a first attachment plate including a first hydraulic fitting and defining a first central bore;
   a second attachment plate including a second hydraulic fitting and defining a second central bore; and
   a single piece resilient member defining a third central bore and disposed between the first and second attachment plates,
   wherein the first, second and third central bores are in fluid communication with each other to provide a hydraulic fluid communication path between the first hydraulic fitting and the second hydraulic fitting, and
   wherein the single piece resilient member is configured to permit flexing of the vibration isolator between the first and second attachment plates.

2. The vibration isolator of claim 1 wherein the first and second attachment plates are bonded to the resilient member, providing a fluid tight seal between each attachment plate and the resilient member.

3. The vibration isolator of claim 1 wherein first and second attachment plates include identical configurations.

4. The vibration isolator of claim 3 wherein the attachment plates include a rectangular configuration with four straight sides that meet at four corners, wherein the plates define a mounting hole in each corner.

5. The vibration isolator of claim 1 wherein the first and second attachment plates include outer surfaces that are flat and inner surfaces that contact the resilient member that are flat.

6. The vibration isolator of claim 5 wherein the outer surfaces of the first and second attachment plates define seal grooves that surround the central bores of the attachment plates.

7. The vibration isolator of claim 4 wherein the resilient member includes a first end and a second end that have generally octagonal configurations that define octagonal perimeters with eight flat sides.

8. The vibration isolator of claim 7 wherein every other flat side of the octagonal perimeter is at least nearly tangent to a straight side of an attachment plate.

9. The vibration isolator of claim 7 wherein the resilient member defines a necked intermediate portion disposed between the first and second ends.

10. The vibration isolator of claim 1 wherein the attachment plates and resilient member each define a center of mass and the central bores include a cylindrical configuration with a center and wherein each of the centers of the central bores and each of the centers of mass are aligned with each other.

11. A vibratory plate compactor assembly comprising:
an upper portion;
a lower portion that is movably attached to the upper portion and that includes a compacting plate;
a vibration mechanism operatively associated with the lower portion for vibrating the lower portion;
a hydraulic manifold that is attached to the upper portion; and
at least a first vibration isolator that connects the upper portion to the lower portion; the vibration isolator including
a first attachment plate including a first hydraulic fitting and defining a first central bore;
a second attachment plate including a second hydraulic fitting and defining a second central bore; and
a single piece resilient member defining a third central bore and disposed between the first and second attachment plates,
wherein the first, second and third central bores are in fluid communication with each other to provide a hydraulic fluid communication path between the first hydraulic fitting and the second hydraulic fitting, and
wherein the single piece resilient member is configured to permit flexing of the vibration isolator between the first and second attachment plates.

12. The vibratory plate compactor assembly of claim 11 further comprising a second vibration isolator that is similarly configured as the first vibration isolator.

13. The vibratory plate compactor assembly of claim 12 further comprising a first conduit that connects the first vibration isolator to the manifold and a second conduit that connects the first vibration isolator to the vibration mechanism.

14. The vibratory plate compactor assembly of claim 13 further comprising a third conduit that connects the second vibration isolator to the vibration mechanism and a fourth conduit that connects the second vibration isolator to the manifold.

15. The vibratory plate compactor assembly of claim 12 further comprising a third and a fourth vibration isolator wherein the third and fourth vibration isolators lack central bores.

16. The vibratory plate compactor assembly of claim 15 wherein the vibration mechanism includes a hydraulic cylinder that includes a hydraulic inlet and a hydraulic outlet that are in close proximity to one another and the first vibration isolator is in close proximity to the inlet and the second vibration isolator is in close proximity to the outlet.

17. The vibratory plate compactor assembly of claim 16 wherein the third and fourth vibration isolators are disposed on the opposite side of the assembly compared to the position of the first and second vibration isolators.

18. The vibratory plate compactor assembly of claim 11 wherein the upper portion of the assembly includes a downward extending connecting bracket and the lower portion of the assembly includes an upward extending attachment bracket and the first vibration isolator is fastened to and positioned between the upward extending and downwardly extending attachment brackets.

19. The vibratory plate compactor assembly of claim 11 wherein the attachment plates of the first vibration isolator each defines seal groove and a seal is disposed in the seal groove.

20. A vibratory plate compactor assembly comprising:
an upper portion;
a lower portion that is movably attached to the upper portion and that includes a compacting plate;
a vibration mechanism operatively associated with the lower portion for vibrating the lower portion;
a hydraulic manifold that is attached to the upper portion;
a first vibration isolator that connects the upper portion to the lower portion; the vibration isolator including
a first attachment plate including a first hydraulic fitting and defining a first central bore;
a second attachment plate including a second hydraulic fitting and defining a second central bore; and
a single piece resilient member defining a third central bore and disposed between the first and second attachment plates,
wherein the first, second and third central bores are in fluid communication with each other to provide a hydraulic fluid communication path between the first hydraulic fitting and the second hydraulic fitting, and
wherein the single piece resilient member is configured to permit flexing of the vibration isolator between the first and second attachment plates;
a second vibration isolator that is similarly configured to the first vibration isolator;
a first rigid tubing that is in fluid communication with the manifold and the first vibration isolator;
a second rigid tubing that is in fluid communication with the first vibration isolator and the vibration mechanism;
a third rigid tubing that is in fluid communication with the vibration mechanism and the second vibration isolator; and
a fourth rigid tubing that is in fluid communication with the second vibration isolator and the manifold.

* * * * *